United States Patent
Fernald (10) Patent No.: US 7,568,117 B1
(45) Date of Patent: Jul. 28, 2009

(54) ADAPTIVE THRESHOLDING TECHNIQUE FOR POWER SUPPLIES DURING MARGINING EVENTS

(75) Inventor: Kenneth W. Fernald, Austin, TX (US)

(73) Assignee: Zilker Labs, Inc., Austin, TX (US)

( * ) Notice: Subject to any disclaimer, the term of this patent is extended or adjusted under 35 U.S.C. 154(b) by 458 days.

(21) Appl. No.: 11/355,447

(22) Filed: Feb. 16, 2006

Related U.S. Application Data (60) Provisional application No. 60/723,282, filed on Oct. 3, 2005.

(51) Int. Cl.
G06F 11/30 (2006.01)
G06F 11/00 (2006.01)
H02M 3/335 (2006.01)

(52) U.S. Cl. .................... 713/340; 714/22; 363/21.01

(58) Field of Classification Search ................. 713/300, 713/340
See application file for complete search history.

(56) References Cited

U.S. PATENT DOCUMENTS

| | | | |
|---|---|---|---|
| 5,943,246 A * | 8/1999 | Porter | 700/293 |
| 6,157,222 A | 12/2000 | Yaklin | |
| 6,175,217 B1 * | 1/2001 | Da Ponte et al. | 322/19 |
| 6,356,464 B1 * | 3/2002 | Balakrishnan et al. | 363/21.01 |
| 6,359,426 B1 | 3/2002 | Sarles et al. | |
| 6,388,853 B1 * | 5/2002 | Balakrishnan et al. | 361/93.9 |
| 6,456,157 B1 | 9/2002 | Forbes et al. | |
| 6,674,672 B2 | 1/2004 | Forbes et al. | |
| 6,750,640 B2 * | 6/2004 | Balakrishnan et al. | 323/314 |
| 6,954,057 B2 * | 10/2005 | Balakrishnan et al. | 323/314 |
| 7,017,060 B2 | 3/2006 | Therien et al. | |
| 7,088,141 B2 | 8/2006 | Deogun et al. | |
| 7,099,164 B2 | 8/2006 | Zhu et al. | |
| 7,149,098 B1 | 12/2006 | Chen | |
| 2002/0024378 A1 | 2/2002 | Forbes et al. | |
| 2003/0174453 A1 * | 9/2003 | Hsu et al. | 361/78 |
| 2004/0071001 A1 * | 4/2004 | Balakrishnan et al. | 363/95 |
| 2006/0291258 A1 | 12/2006 | Zhu et al. | |
| 2007/0029979 A1 * | 2/2007 | Williams et al. | 323/217 |

* cited by examiner

*Primary Examiner*—Suresh K Suryawanshi
(74) *Attorney, Agent, or Firm*—Meyertons Hood Kivlin Kowert & Goetzel, P.C.; Jeffrey C. Hood (57) ABSTRACT

Adaptive thresholding technique for power supplies during margining events. A power supply may include a fault detection mechanism for monitoring an output voltage of the power supply to determine whether the output voltage is greater than a first over-voltage threshold or less than a first under-voltage threshold. If a margining event changes the power supply output voltage, the fault detection mechanism may dynamically change a first over-voltage threshold and a first under-voltage threshold based on the margining event to a second over-voltage threshold and a second under-voltage threshold. Then, during the margining event, the fault detection mechanism may monitor the output voltage of the power supply to determine whether the output voltage is greater than a second over-voltage threshold or less than a second under-voltage threshold. The fault detection mechanism may dynamically change a fault threshold in proportion to the change in the power supply output voltage.

23 Claims, 5 Drawing Sheets

Fig. 9

ADAPTIVE THRESHOLDING TECHNIQUE FOR POWER SUPPLIES DURING MARGINING EVENTS

PRIORITY CLAIM

This application claims benefit of priority of U.S. provisional application Ser. No. 60/723,282 titled "System and Method for Implementing Distributed Power Management", filed Oct. 3, 2005.

BACKGROUND OF THE INVENTION

1. Field of the Invention

This invention relates to power distribution systems and, more particularly, to a method and apparatus for managing fault thresholds in power supplies during margining events.

2. Description of the Related Art

From 1995 to 2001, the highest density processors from manufacturers such as Intel went from a power consumption rate of about 30 Watts at 3.3 V to a power consumption rate of about 90 Watts delivered at 1.5 V. A simple application of the power-voltage-current relationship reveals that the total current consumed by these chips has increased from nine amps to about 60 amps in a very short time period. There are similar analogies with all larger digital integrated circuits (ICs).

This rapid evolution has created new and significant problems in delivery of the power to and removal of waste heat from these ICs. Power supply design is now a much more critical and difficult task than it was a few years ago. High-current/low-voltage ICs require a very clean and stable source of DC power. The power source must be capable of delivering very fast current transients. The electronic path to these loads must also have low resistance and inductance (a 1.5V supply would be completely dropped across a 25 m$\Omega$ resistance at 60 Amps).

Figure 1:
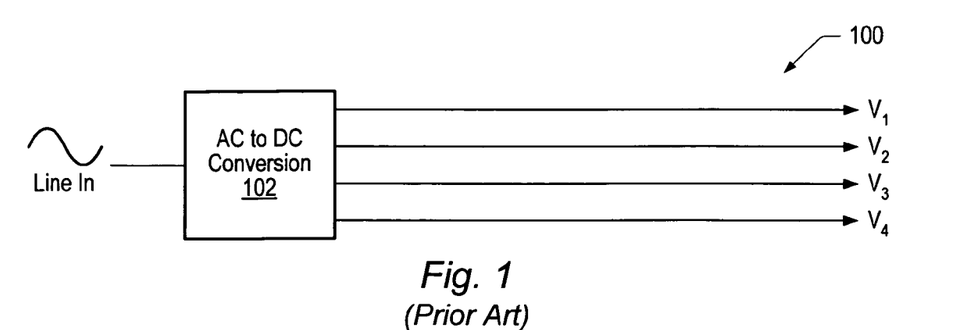
FIG. 1 is a prior art power distribution circuit.

Traditionally, DC power supplies were designed to convert AC line voltage to one or more DC outputs that would be routed throughout a system to the points of load (POL). FIG. 1 is an illustration of a prior art power distribution system. As shown in FIG. 1, a power distribution scheme 100 may comprise an AC to DC converter 102 generating output voltages $V_1$, $V_2$, $V_3$, and $V_4$ that may be distributed to various POLs (point of loads). However, it may not be practical to route high-current signals throughout a system.

Figure 2:
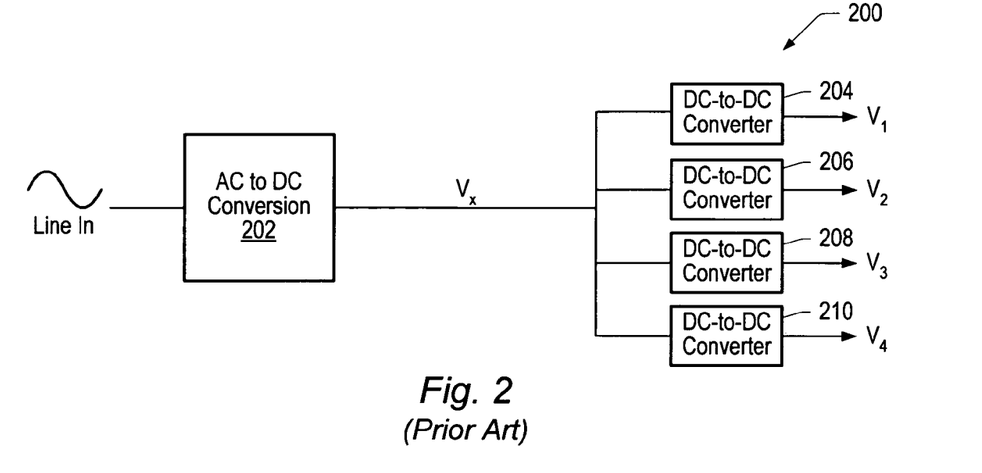
FIG. 2 is a prior art distributed power architecture (DPA)

To overcome this difficulty, and to reduce the ill effects of distributing high current signals around a system, an alternative method of distributing power at modest voltage and current levels has been adopted. Rather than converting an AC supply voltage level to the DC voltage level required by various loads at a central location, the AC supply voltage is typically converted to a "reasonable" DC voltage and routed to the "point of load" (POL), where it is converted locally to the required low voltage. This technique is referred to as "Distributed Power Architecture", or DPA, and is illustrated in FIG. 2. As shown in PDA system 200 of FIG. 2, an AC to DC voltage converter 202 may produce an intermediate DC voltage $V_x$, which may be routed to individual local DC to DC converters 204, 206, 208, and 210, which in turn may provide the required DC voltages $V_1$, $V_2$, $V_3$, and $V_4$, respectively, to their corresponding POLs. With a DPA, errors may be reduced since the distance traveled by a high-current signal is minimized, thus reducing I×R (resistive) and L di/dt (inductive) errors.

In many power distribution systems it is typically not enough to just distribute power around a system to the various POLs. Complex electronic systems are generally monitored and controlled to ensure maximum reliability and performance. Functions (power supply features) typically implemented in DPA systems are listed below.

Supply Sequencing

A modern electronic system can contain many ICs and each IC can have several supply voltage requirements. For example, core logic may require one voltage and the I/O may require a different voltage. This typically results in a need for setting the order in which the voltages on a single chip are applied and the order in which the chips in a system are powered up.

Hot Swap

Many electronic systems, including computers, telecom racks, storage devices and battery-operated devices require "hot swap" capability. Hot swap capability typically comprises the live attachment of a device to power, i.e., attaching a device to a system that is powered up (without having to power down the system prior to the attachment). Examples of hot swap events may include installing a battery in a PDA or plugging a USB device into a computer.

Ramp Control

It is sometimes necessary to control the rate at which the DC output voltage of a converter ramps from its initial value to its nominal value. This may be done in support of managing a hot-swap event, sequencing requirement or satisfying the requirements of the load.

Voltage Programming

The final voltage presented to a load may need to be programmed to the desired value or may need to be "trimmed" to a precise value. Some systems require active voltage programming of devices during their use.

Load Monitoring

In order to maintain high reliability of an electronic system, monitoring of load status is sometimes required. Both current and voltage may need to be monitored and action may need to be taken based on the load status measurements. Current and voltage may also need to be monitored for undershoot and overshoot conditions. In some systems, when an error is detected, the system may take corrective action by switching the load off, isolating the load or just setting a system flag.

Tracking

Many times it is desirable to have the output of one or more converters follow, or mirror, the output of one or more other converters in the system. Tracking a specific voltage level, for example, may include setting the voltage level of a tracking converter or device to the voltage level of a tracked converter or device, and changing the voltage level of the tracking device to match the voltage level of the tracked device any time the voltage level of the tracked device changes. In some cases the voltage levels of tracking devices and tracked devices may not be the same; changes in the tracked voltage level would simply be mirrored in the voltage output of the tracking devices. For example, if the tracked voltage increases by 0.2V, the tracking voltage would also increase by 0.2V.

Temperature Monitoring

Dense electronic systems often generate excessive waste heat. The excessive heat generally needs to be removed in order to keep the electronics operating at their safe operating temperature. Therefore, the temperature of individual loads as well as the temperature of various locations within the system's enclosure is typically monitored. When temperatures reach unacceptable limits, action may need to be taken locally and/or at the system level. Such corrective actions often include turning on or speeding up fans, setting an alarm or simply shutting down the power to the problematic load. Temperatures can be measured using several methods. Some large digital processors sometimes incorporate embedded temperature sensor diodes on chip. Other systems may employ thermistors and IC temperature sensors.

Fan Speed Control

In conjunction with temperature monitoring it is often necessary to monitor and control fan speed. This may be done to control air flow or to control acoustic noise.

Phase Control

DC voltage is typically stepped down in one of two ways, linear regulation and DC-to-DC conversion. DC-to-DC converters may step down DC voltage by pulse width modulation (PWM) of an input voltage and passive filtering of the output. The duty cycle of the PWM signal generally approximates the ratio of output voltage to input voltage divided by the efficiency of the converter. For example, for an ideal DC-to-DC converter with a desired output of 1.2V and an input of 12V, the duty cycle would be 10%. In high current applications, it is often desirable to force the various DC-to-DC converters to sample different "phases" of their clock cycle. That is, to prevent DC-to-DC converters in a system from all sampling the first 10% of a clock cycle, one converter may sample the first 10% of the clock cycle and the next converter may sample a different 10% of the clock cycle, and so on. This typically reduces noise and improves transient response. This technique is also used in motor control and is often implemented to control multiple fans in a system. PWM controlled fans with staggered phase typically offer reduced acoustic noise.

Current Sharing

In addition to forcing DC-to-DC converters to sample staggered phases of the switching clock, it is sometimes desirable to force two or more independent converters to each deliver an equal share of the load current. This approach provides improved noise and transient response in high-current applications.

Programmable Switching Frequency

Certain DC-to-DC converters feature programmable switch frequencies. Frequencies may be selected based on several system concerns.

Synchronization of Switching Clocks

It is often desirable to synchronize the switching frequency of DC-to-DC converters in a system to each other or to some other system clock. This is typically performed to reduce the probability of mixing the clock or its harmonics with important system clocks. It is of particular interest in communication applications.

There are other functions that may be required for power systems. For example, single points of temperature measurement, open/closed status of doors and vibration may be of interest.

In order to accommodate a demand for more power and denser systems and the resulting new distribution problems, many present power distribution schemes began offering multiples of each solution, or functions, in a single package. Typically each of these functions requires a separate configuration within the system. That is, each function may require its own interconnection network tying the POL converters together. The interconnection network may implement gluelogic that may be required for control of the POL converters in order for the particular function to be successfully executed during system operation. Many of these functions comprise analog signal control requiring corresponding analog signal lines, with POL converters interconnected in point-to-point configurations. Routing of such signals is often difficult, while no true communication is established between various POL converters and/or between the POL converters and any other elements of the system.

Figure 3:
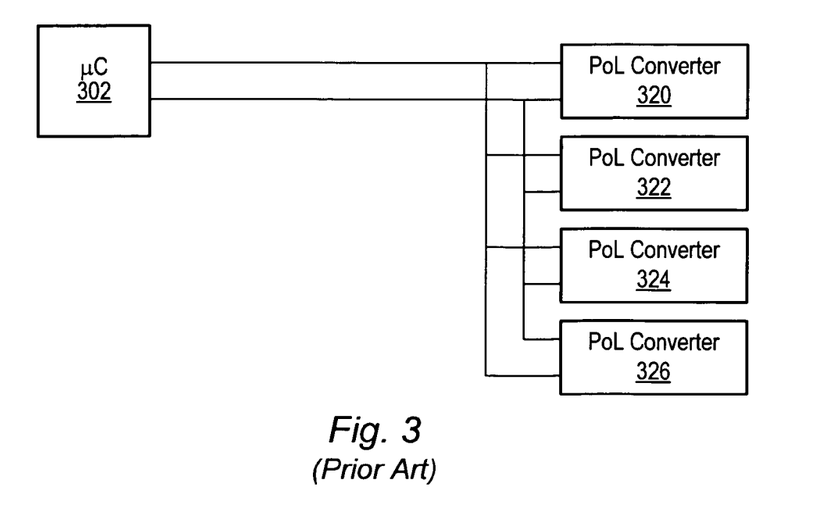
FIG. 3 is a prior art system wherein a microcontroller communicates with POL converter devices over an I²C bus.

In an effort to tie all or most of these functions together at the system level, one approach has been to implement the functions in control ICs responsible for controlling respective POL converters. Some of the functionality may also be programmed into a microcontroller that may communicate with attached POL converters over an I²C (inter-IC communication) bus to coordinate control of all POL converters in the system. FIG. 3 illustrates an example of an I²C-based system. As shown in FIG. 3, a microcontroller 302 may be coupled to POL converters 320, 322, 324, and 326, with the connections between the devices representing an I²C bus. A configuration as shown in FIG. 3 is typically not suited for active control and is used mainly for status monitoring, where POL converters 320, 322, 324, and 326 may send a status signal back to microcontroller 302, which in turn may send a simple control signal to a respective POL converter based on the status information received from the respective POL converter. In general, microcontroller 302 checks status for one POL converter at a time, which may be viewed as a disadvantage when more interactive, real-time communication is desired in a system.

Figure 4:
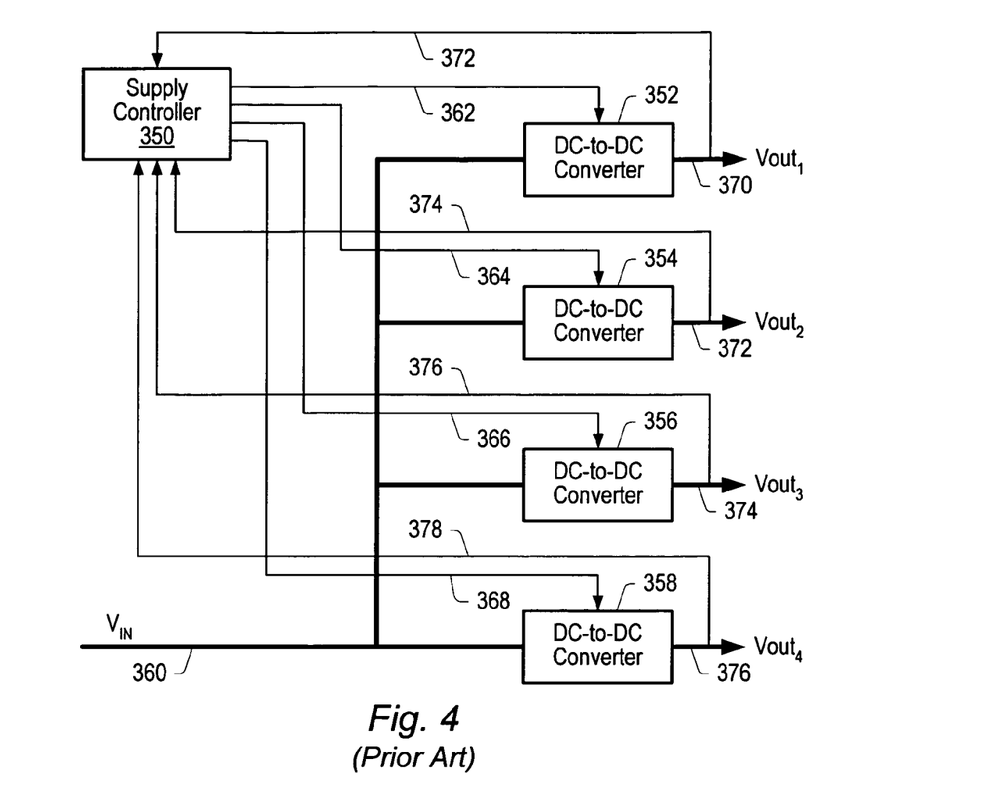
FIG. 4 is a prior art system wherein DC-to-DC voltage converters are interconnected in a point-to-point configuration, controlled by a central supply controller to perform a specific function.

FIG. 4 illustrates one example of a single function implemented in a DPA system. Typically, a supply controller 350 (providing control for executing the function) and DC-to-DC voltage converters 352, 354, 356, and 358 are connected in a point-to-point configuration as shown. Supply controller 350 is coupled to each DC-to-DC converter over dedicated lines, (typically analog lines are used for implementing most functions), more specifically over lines 372 and 362 to converter 352, lines 374 and 364 to converter 354, lines 376 and 366 to converter 355, and lines 378 and 368 to converter 358. Input supply voltage $V_{IN}$ 360 is coupled to each DC-to-DC converter, and in turn DC-to-DC converter 352 may produce, for a respective POL or POLs, DC output voltage 370, DC-to-DC converter 354 may produce DC output voltage 372, DC-to-DC converter 356 may produce DC output voltage 374, and DC-to-DC converter 358 may produce DC output voltage 376.

Power supply designs typically require output monitoring mechanisms such as an under-voltage monitoring mechanism and an over-voltage monitoring mechanism. The under-voltage monitoring mechanism may detect if the power supply output voltage is below an under-voltage threshold. If the power supply output voltage is below the under-voltage threshold, the under-voltage monitoring mechanism indicates a fault condition. Similarly, the over-voltage monitoring mechanism may detect if the power supply output voltage is above an over-voltage threshold. If the power supply output voltage is above the over-voltage threshold, the over-voltage monitoring mechanism indicates a fault condition. Both of these functions protect the power supply and associated loads in the event of a malfunction.

Additionally, power supply designs usually require a margining function, which increases or decreases the power supply output voltage by a particular amount under normal operating conditions. Since margining is performed under normal operating conditions, the under-voltage monitoring mechanism and the over-voltage monitoring mechanism are typically disabled to prevent falsely triggering a fault condition when there is no fault in the system. By disabling the fault mechanisms, the system may not detect a fault condition during a margining event, which may damage the power supply and/or the load circuit components.

Many other problems and disadvantages of the prior art will become apparent to one skilled in the art after comparing such prior art with the present invention as described herein.

SUMMARY OF THE INVENTION

Various embodiments are disclosed of a power supply configured to implement an adaptive thresholding technique for margining events. In one embodiment, the power supply includes a fault detection mechanism for monitoring an output voltage of the power supply to determine whether the output voltage is greater than a first over-voltage threshold or less than a first under-voltage threshold. If a margining event changes the output voltage of the power supply, the fault detection mechanism may dynamically change a first over-voltage threshold and a first under-voltage threshold based on the margining event to a second over-voltage threshold and a second under-voltage threshold. Then, during the margining event, the fault detection mechanism may monitor the output voltage of the power supply to determine whether the output voltage is greater than a second over-voltage threshold, and monitor the output voltage of the power supply to determine whether the output voltage is less than a second under-voltage threshold.

In one embodiment, if a margining event increases the output voltage of the power supply, the fault detection mechanism may dynamically increase a voltage value corresponding to the first over-voltage threshold in proportion to the increase in the power supply output voltage to a voltage value corresponding to the second over-voltage threshold, and may dynamically increase a voltage value corresponding to the first under-voltage threshold in proportion to the increase in the power supply output voltage to a voltage value corresponding to the second under-voltage threshold.

Similarly, if a margining event decreases the output voltage of the power supply, the fault detection mechanism may dynamically decrease a voltage value corresponding to the first over-voltage threshold in proportion to the decrease in the power supply output voltage to a voltage value corresponding to the second over-voltage threshold, and may dynamically decrease a voltage value corresponding to the first under-voltage threshold in proportion to the decrease in the power supply output voltage to a voltage value corresponding to the second under-voltage threshold.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION

The following references are hereby incorporated by reference in their entirety as though fully and completely set forth herein:

U.S. Patent Application Publication No. 2004/0201279 (Ser. No. 10/820,976), titled "Method And Apparatus For Improved DC Power Delivery, Management And Configuration," filed Jun. 21, 2004.

U.S. patent application Ser. No. 11/198,698, titled "Method For Using a Multi-Master Multi-Slave Bus For Power Management," filed Aug. 5, 2005.

Figure 5:
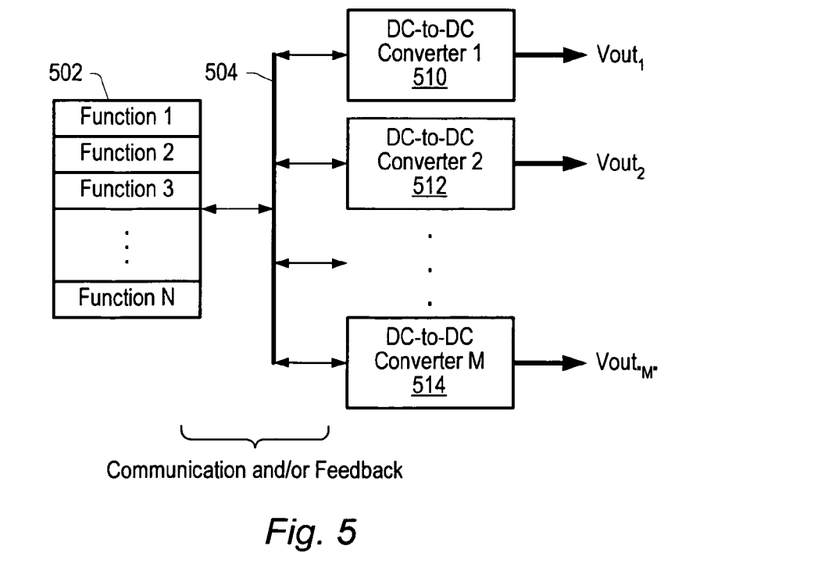
FIG. 5 is a block diagram of one embodiment of a system for improving DC power delivery, management, and configuration.

FIG. 5 is a block diagram of one embodiment of a power distribution system. As shown, the common functions required in a complex DC power system may be combined in a single controller rather than treated as separate IC functions. As illustrated in the embodiment of FIG. 5, a controller 502 managing functions 1 through N may be coupled to DC-to-DC converters 1 through M (illustrated by example as power converters 510, 512 and 514) via a digital bus 504. Digital bus 504 may be a serial bus enabling communication with reduced wiring requirements. In the configuration shown in FIG. 5, real-time communication is made possible between power converters 510, 512, and 514 and controller 502 by their being coupled to serial digital bus 504. It is noted, however, that in other embodiments the power converters may communicate with the controller 502 and with each other by other means, e.g., a parallel bus.

Figure 6:
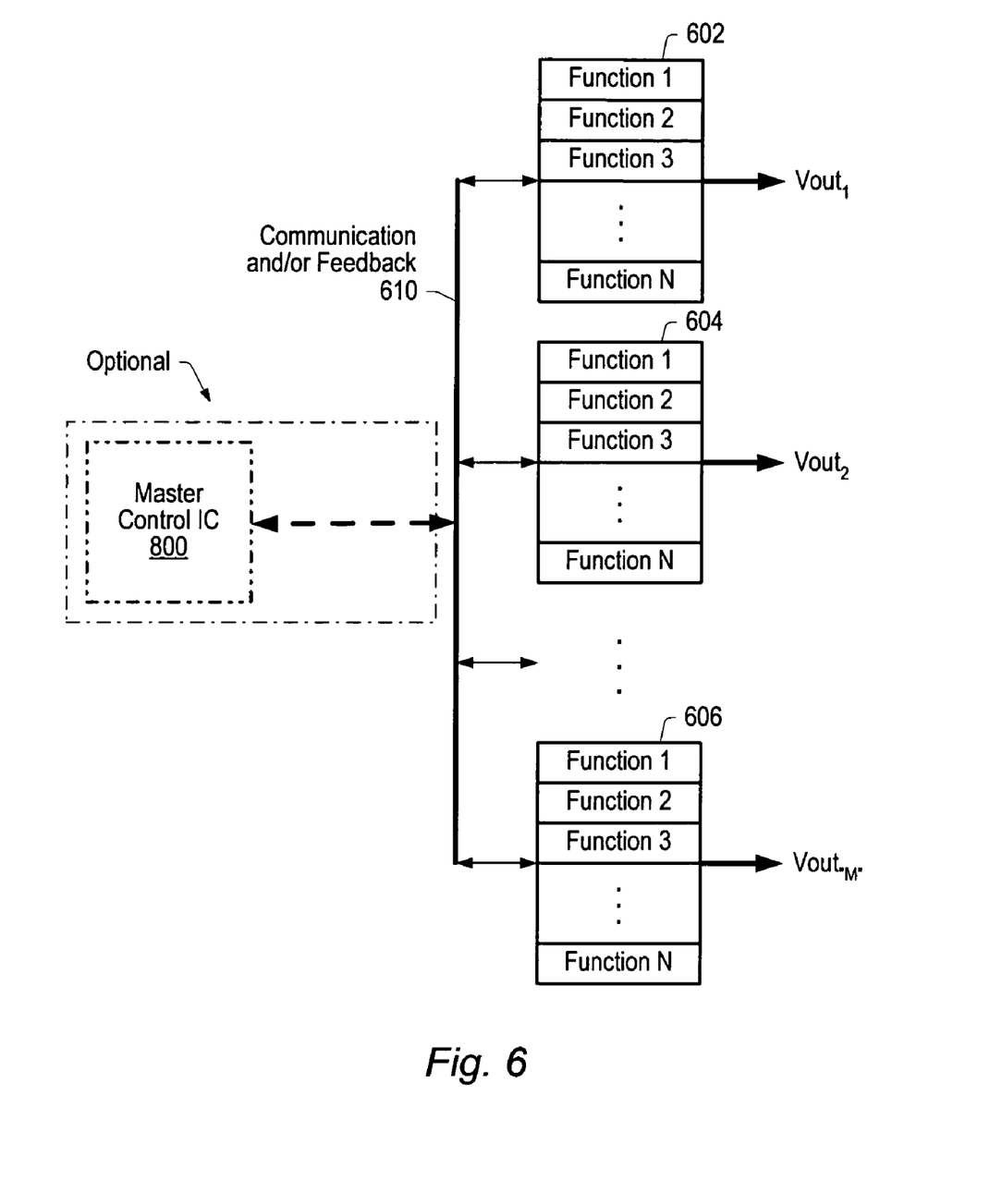
FIG. 6 is a block diagram of one embodiment of a system including digital power management devices (DPMDs)

The illustrated embodiment of FIG. 6 provides a system-oriented solution using mixed-signal IC technology, allocating one unit of each function to a single point of load (POL) IC, or digital power management device (DPMD). In this embodiment, one DC-to-DC voltage converter, one unit of supply sequencing, one unit of load monitoring, and one respective unit of various other functions (previously discussed) are combined in each DPMD, e.g., in each of DPMD 602, DPMD 604, and DPMD 606.

As illustrated in the embodiment of FIG. 6, DPMDs 602, 604, and 606 have each been allocated Functions 1 through N, and are coupled together via serial digital bus 610. Bus 610 may be simpler than an I²C bus and may offer more control and signaling, including real-time data feedback capability. Bus 610 may also allow each DPMD to be coupled to a master control IC (MCIC) 800, or to be coupled only to each other, enabling all system level functions to be configured, controlled and monitored providing simple and flexible results. MCIC 800 is shown mostly for illustrative purposes, and preferred embodiments may omit MCIC 800 and only include DPMDs coupled to bus 610, where all required functions may be controlled by a single DPMD or a group of DPMDs operating together. By configuring each POL device or DPMD to have the ability to communicate with any other POL device or DPMD coupled to bus 610, each POL device or DPMD may act as either a master or a slave on bus 610, thereby obviating the need for MCIC 800 where it may be desirable to design a power delivery system without MCIC 800, or without any other similar central control unit.

Various embodiments, as illustrated in FIG. 6, provide a modular approach to designing DPA systems, providing system level functionality without requiring the system to be individually and separately configured for each desired function that may be required. Each DPMD may be individually configured prior to its being placed in the system, and may operate to perform all necessary functions by having access to real-time feedback information over bus 610, and by communicating with other DPMDs. This represents active control as opposed to simple status monitoring. Several devices may be enabled when the DPA system is configured as illustrated in the embodiment FIG. 6. Rather than just having a DC-to-DC converter, a DPMD may comprise a DC-to-DC converter, and any or all of the associated control, configuration and monitoring functions associated with a single node. In some embodiments, each DPMD of FIG. 6 and/or each power converter of FIG. 5 may implement an adaptive thresholding technique during margining events, as will be further described below with reference to FIGS. 7-9.

Figure 7:
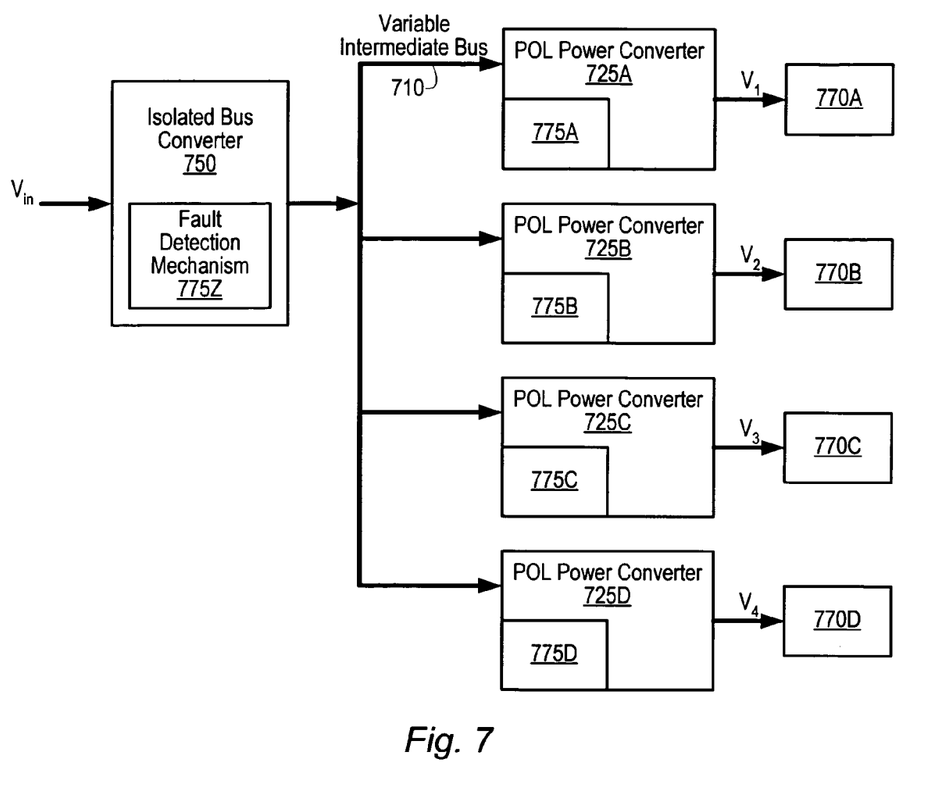
FIG. 7 is a block diagram of one embodiment of a power distribution system including one or more power supplies that implement an adaptive thresholding mechanism for margining events.

FIG. 7 is a block diagram of one embodiment of a power distribution system 700 including one or more power supplies that implement an adaptive thresholding mechanism for margining events. A power supply may be defined as any device that supplies power in a system (e.g., power distribution system 700). In the illustrated embodiment of FIG. 7, isolated bus converter 750 and power converters 725 function as power supplies in power distribution system 700.

In one specific implementation, power distribution system 700 is formed as shown in the embodiment of FIG. 7. In this embodiment, power distribution system 700 may include isolated bus converter 750, intermediate bus 710, and power converters 725A-725D. Bus converter 750 may include fault detection mechanism 775Z, and power converters 725A-725D may include fault detection mechanisms 775A-775D, respectively. It is noted that in various embodiments bus converter 750 and/or power converters 725 may be configured as DC-to-DC converters, digital power management devices (DPMDs), and AC-to-DC converters, among others. In one embodiment, power converters 725A-725D are connected to loads 770A-770D, respectively. It is further noted that the components described with reference to FIG. 7 are meant to be exemplary only, and are not intended to limit the invention to any specific set of components or configurations. For example, in various embodiments, one or more of the components described may be omitted, combined, modified, or additional components included, as desired.

During operation, power generation circuitry of isolated bus converter 750 provides voltage to power converters 725 via intermediate bus 710, and in turn power converters 725 provide voltage ($V_1$-$V_4$) to loads 770. The corresponding fault detection mechanism 775 determines whether the output voltage is greater than a first over-voltage (OV) threshold or less than a first under-voltage (UV) threshold to protect the components of power distribution system 700. For example, fault detection mechanism 775Z of bus converter 750 may determine whether the voltage output to the power converters 725 exceeds a first OV threshold, and may determine whether the output voltage is at a level below the UV threshold. If one of these fault conditions is met, a fault detection mechanism detects the fault condition and may initiate a fault recovery procedure, e.g., shutdown the power supply. In one embodiment, bus converter 750 and power converters 725 may include a memory for storing the first OV and UV thresholds.

During operation, a margining event may be initiated which changes the output voltage of one or more of the power supplies (e.g., bus converter 750 or at least one power converter 725). For example, the margining event may increase the output voltage from a nominal target voltage to a voltage value 10% higher than the nominal target voltage. The fault detection mechanism 775 of the one or more affected power supplies detects the margining event and implements an adaptive thresholding technique to modify the both the OV threshold and the UV threshold based on the margining event to continue to provide fault protection and yet prevent falsely detecting a fault condition in system 700. In one embodiment, the modified OV and UV thresholds (i.e., the second OV and UV thresholds) may be stored in the memory of the corresponding power supply.

Figure 8:
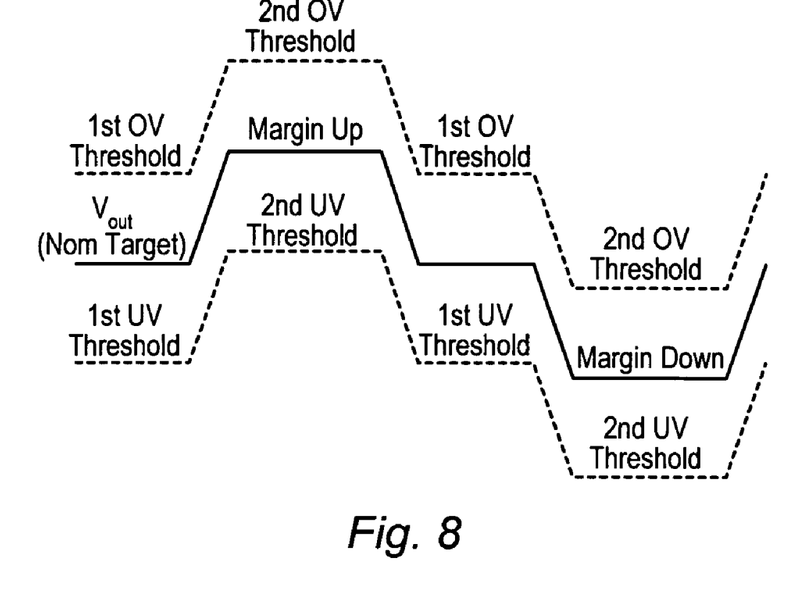
FIG. 8 is a timing diagram illustrating an adaptive thresholding technique implemented by a fault detection mechanism of a power supply, according to one embodiment.

FIG. 8 is a timing diagram illustrating an adaptive thresholding technique implemented by a fault detection mechanism 775 of a power supply, according to one embodiment. As illustrated in FIG. 8, in response to a margining event increasing the output voltage ($V_{out}$) of the power supply (e.g., bus converter 750), the fault detection mechanism (e.g., 775Z) dynamically increases a voltage value corresponding to the first OV threshold in proportion to the increase in the power supply output voltage to a voltage value corresponding to a second OV threshold. Additionally, fault detection mechanism 775 dynamically increases a voltage value corresponding to the first UV threshold in proportion to the increase in the power supply output voltage to a voltage value corresponding to a second UV threshold.

Similarly, as shown in FIG. 8, in response to a margining event decreasing the output voltage ($V_{out}$) of the power supply, fault detection mechanism 775 dynamically decreases a voltage value corresponding to the first OV threshold in proportion to the decrease in the power supply output voltage to a voltage value corresponding to a second OV threshold. Furthermore, fault detection mechanism 775 dynamically decreases a voltage value corresponding to the first UV threshold in proportion to the decrease in the power supply output voltage to a voltage value corresponding to a second UV threshold.

Fault detection mechanism 775 may then monitor the output voltage of the power supply to determine whether the output voltage is greater than a second over-voltage threshold, and also monitor the output voltage to determine whether the output voltage is less than a second under-voltage threshold. If one of these modified fault conditions is met, fault detection mechanism 775 detects the fault condition and may initiate a fault recovery procedure.

The OV and UV thresholds may be modified in various ways in response to detecting a margining event. In one embodiment, if a margining event changes the power supply output voltage (i.e., a nominal target voltage value) by a particular percentage, fault detection mechanism 775 may dynamically modify the OV and UV thresholds by the same percentage. For example, if the margining event increases the output voltage of power converter 725C by 10%, fault detection mechanism 775C also increases the OV and UV thresholds by 10%. In some embodiments, if a margining event changes the power supply output voltage, the fault detection mechanism 775 may dynamically change the OV and UV thresholds by a programmable fixed amount.

In various embodiments, during a margining event, fault detection mechanism 775 may dynamically determine the difference between the margin output voltage and the nominal target voltage value and dynamically modify the OV and UV thresholds by the calculated amount. For example, if the margining event increased the power supply output voltage by 1V, fault detection mechanism 775 may increase the first OV and UV thresholds by 1V to derive the second OV and UV thresholds. In these embodiments, as the margining event ramps up or ramps down the power supply output voltage, fault detection mechanism 775 may dynamically ramp up or ramp down the OV and UV thresholds by the same amount. It is noted that the above-described methods for changing the fault thresholds are exemplary only and are not intended to limit the invention to these specific methods. In other embodiments, the OV and UV thresholds may be modified during a margining event in a variety ways and by various methods, e.g., the OV and UV thresholds may be changed by a different percentage than the change in the power supply output voltage.

In some embodiments, in response to a margining event, the fault detection mechanism 775 of one or more of the power supplies in power distribution system 700 may implement an adaptive thresholding technique to modify either the OV threshold or the UV threshold based on whether the margining event increases or decreases the power supply output voltage.

Figure 9:
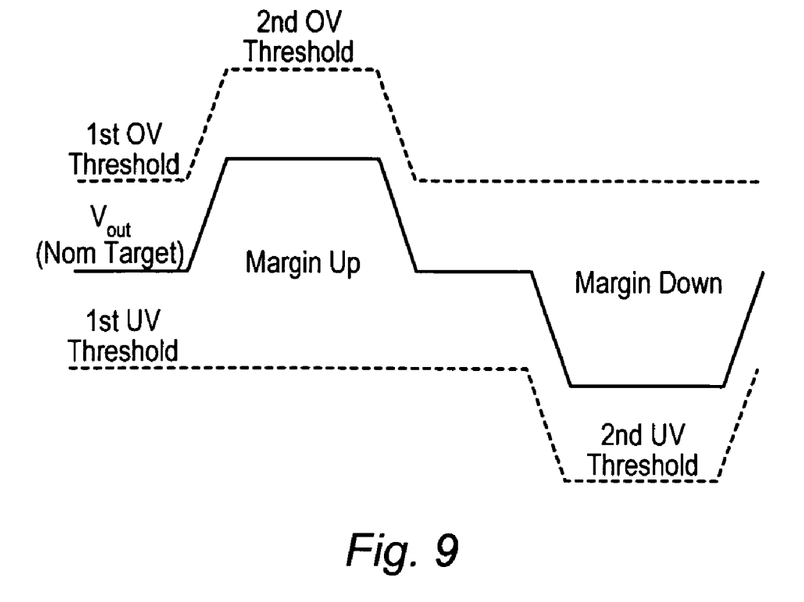
FIG. 9 is a timing diagram illustrating an adaptive thresholding technique implemented by a fault detection mechanism of a power supply, according to another embodiment.

FIG. 9 is a timing diagram illustrating this adaptive thresholding technique, according to another embodiment. As illustrated in the embodiment of FIG. 9, in response to a margining event increasing the output voltage ($V_{out}$) of the power supply (e.g., power converter 725A), fault detection mechanism 775 (e.g., 775A) dynamically increases a voltage value corresponding to the first OV threshold in proportion to the increase in the power supply output voltage to a voltage value corresponding to the second OV threshold. In addition, fault detection mechanism 775 maintains a voltage value corresponding to the first UV threshold. Therefore, in this case, fault detection mechanism 775 monitors the output voltage of the power supply to determine whether the output voltage is greater than the second OV threshold, and monitors the output voltage of the power supply to determine whether the output voltage is less than the first UV threshold. If one of these fault thresholds is exceeded, fault detection mechanism 775 detects the fault condition and may initiate a fault recovery procedure.

Similarly, as shown in FIG. 9, in response to a margining event decreasing the output voltage of the power supply, fault detection mechanism 775 dynamically decreases a voltage value corresponding to the first UV threshold in proportion to the decrease in the power supply output voltage to a voltage value corresponding to the second UV threshold. Furthermore, fault detection mechanism 775 maintains a voltage value corresponding to the first OV threshold. Therefore, in this case, fault detection mechanism 775 monitors the output voltage of the power supply to determine whether the output voltage is greater than the first OV threshold, and monitors the output voltage of the power supply to determine whether the output voltage is less than the second UV threshold. If one of these fault thresholds is exceeded, fault detection mechanism 775 detects the fault condition and may initiate a fault recovery procedure. As described above, the OV threshold or the UV thresholds may be modified in various ways and by various methods in response to detecting a margining event.

It is noted that adaptive thresholding techniques similar to techniques described above may be implemented for other parameters in power distribution system 700 to detect fault conditions. For example, an adaptive thresholding technique may be implemented for current thresholds and/or power thresholds.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for controlling a power supply, the method comprising:
   monitoring an output voltage of the power supply to determine whether the output voltage is greater than a first over-voltage threshold or less than a first under-voltage threshold; and
   in response to a margining event changing the output voltage of the power supply, performing at least one of: 1) monitoring the output voltage of the power supply to determine whether the output voltage is greater than a second over-voltage threshold, and 2) monitoring the output voltage of the power supply to determine whether the output voltage is less than a second under-voltage threshold.

2. The method of claim 1, wherein voltage values corresponding to the second over-voltage threshold and the second under-voltage threshold are dependent upon the margining event.

3. The method of claim 1, further comprising, in response to a margining event increasing the output voltage of the power supply, dynamically increasing a voltage value corresponding to the first over-voltage threshold in proportion to the increase in the power supply output voltage to a voltage value corresponding to the second over-voltage threshold, and maintaining a voltage value corresponding to the first under-voltage threshold.

4. The method of claim 3, wherein, in response to a margining event increasing the output voltage of the power supply, monitoring the output voltage of the power supply to determine whether the output voltage is greater than the second over-voltage threshold, and monitoring the output voltage of the power supply to determine whether the output voltage is less than the first under-voltage threshold.

5. The method of claim 1, further comprising, in response to a margining event decreasing the output voltage of the power supply, dynamically decreasing a voltage value corresponding to the first under-voltage threshold in proportion to the decrease in the power supply output voltage to a voltage value corresponding to the second under-voltage threshold, and maintaining a voltage value corresponding to the first over-voltage threshold.

6. The method of claim 5, wherein, in response to a margining event decreasing the output voltage of the power supply, monitoring the output voltage of the power supply to determine whether the output voltage is greater than the first over-voltage threshold, and monitoring the output voltage of the power supply to determine whether the output voltage is less than the second under-voltage threshold.

7. The method of claim 1, further comprising, in response to a margining event changing the output voltage of the power supply, monitoring the output voltage of the power supply to determine whether the output voltage is greater than a second over-voltage threshold, and monitoring the output voltage of the power supply to determine whether the output voltage is less than a second under-voltage threshold.

8. The method of claim 1, further comprising, in response to a margining event increasing the output voltage of the power supply, dynamically increasing a voltage value corresponding to the first over-voltage threshold in proportion to the increase in the power supply output voltage to a voltage value corresponding to the second over-voltage threshold, and dynamically increasing a voltage value corresponding to the first under-voltage threshold in proportion to the increase in the power supply output voltage to a voltage value corresponding to the second under-voltage threshold.

9. The method of claim 1, further comprising, in response to a margining event decreasing the output voltage of the power supply, dynamically decreasing a voltage value corresponding to the first over-voltage threshold in proportion to the decrease in the power supply output voltage to a voltage value corresponding to the second over-voltage threshold, and dynamically decreasing a voltage value corresponding to the first under-voltage threshold in proportion to the decrease in the power supply output voltage to a voltage value corresponding to the second under-voltage threshold.

10. The method of claim 1, further comprising, in response to a margining event changing the output voltage of the power supply, dynamically calculating the difference between the changed power supply output voltage and a target output voltage, and dynamically changing the first over-voltage threshold and the first under-voltage threshold by the calculated difference.

11. The method of claim 1, wherein, during a margining event, if the power supply output voltage is greater than the second over-voltage threshold or less than the second under-voltage threshold, indicating a fault and initiating a fault recovery procedure.

12. A power supply comprising:
  a memory operable to store a first over-voltage threshold and a first under-voltage threshold; and
  a fault detection mechanism configured to monitor an output voltage of the power supply to determine whether the output voltage is greater than the first over-voltage threshold or less than the first under-voltage threshold;
  wherein, in response to a margining event changing the output voltage of the power supply, the fault detection mechanism is further configured to perform at least one of: 1) monitoring the output voltage of the power supply to determine whether the output voltage is greater than a second over-voltage threshold, and 2) monitoring the output voltage of the power supply to determine whether the output voltage is less than a second under-voltage threshold.

13. The power supply of claim 12, wherein voltage values corresponding to the second over-voltage threshold and the second under-voltage threshold are dependent upon the margining event.

14. The power supply of claim 12, wherein, in response to a margining event increasing the output voltage of the power supply, the fault detection mechanism is configured to dynamically increase a voltage value corresponding to the first over-voltage threshold in proportion to the increase in the power supply output voltage to a voltage value corresponding to the second over-voltage threshold, and maintain a voltage value corresponding to the first under-voltage threshold.

15. The power supply of claim 14, wherein, in response to a margining event increasing the output voltage of the power supply, the fault detection mechanism is configured to monitor the output voltage of the power supply to determine whether the output voltage is greater than the second over-voltage threshold, and monitor the output voltage of the power supply to determine whether the output voltage is less than the first under-voltage threshold.

16. The power supply of claim 12, wherein, in response to a margining event decreasing the output voltage of the power supply, the fault detection mechanism is configured to dynamically decrease a voltage value corresponding to the first under-voltage threshold in proportion to the decrease in the power supply output voltage to a voltage value corresponding to the second under-voltage threshold, and maintain a voltage value corresponding to the first over-voltage threshold.

17. The power supply of claim 16, wherein, in response to a margining event decreasing the output voltage of the power supply, the fault detection mechanism is configured to monitor the output voltage of the power supply to determine whether the output voltage is greater than the first over-voltage threshold, and monitor the output voltage of the power supply to determine whether the output voltage is less than the second under-voltage threshold.

18. The power supply of claim 12, wherein, in response to a margining event changing the output voltage of the power supply, the fault detection mechanism is configured to monitor the output voltage of the power supply to determine whether the output voltage is greater than a second over-voltage threshold, and monitor the output voltage of the power supply to determine whether the output voltage is less than a second under-voltage threshold.

19. The power supply of claim 12, wherein, in response to a margining event increasing the output voltage of the power supply, the fault detection mechanism is configured to dynamically increase a voltage value corresponding to the first over-voltage threshold in proportion to the increase in the power supply output voltage to a voltage value corresponding to the second over-voltage threshold, and dynamically increase a voltage value corresponding to the first under-voltage threshold in proportion to the increase in the power supply output voltage to a voltage value corresponding to the second under-voltage threshold.

20. The power supply of claim 12, wherein, in response to a margining event decreasing the output voltage of the power supply, the fault detection mechanism is configured to dynamically decrease a voltage value corresponding to the first over-voltage threshold in proportion to the decrease in the power supply output voltage to a voltage value corresponding to the second over-voltage threshold, and dynamically decrease a voltage value corresponding to the first under-voltage threshold in proportion to the decrease in the power supply output voltage to a voltage value corresponding to the second under-voltage threshold.

21. The power supply of claim 12, wherein, in response to a margining event changing the output voltage of the power supply, the fault detection mechanism is configured to dynamically calculate the difference between the changed power supply output voltage and a target output voltage, and the fault detection mechanism is further configured to dynamically change the first over-voltage threshold and the first under-voltage threshold by the calculated difference.

22. The power supply of claim 12, wherein, during a margining event, if the power supply output voltage is greater than the second over-voltage threshold or less than the second under-voltage threshold, the fault detection mechanism is configured to indicate a fault and initiate a fault recovery procedure.

23. A power distribution system including a plurality of power supplies, wherein each power supply comprises:

a memory operable to store a first over-voltage threshold and a first under-voltage threshold; and a fault detection mechanism configured to monitor an output voltage of the power supply to determine whether the output voltage is greater than the first over-voltage threshold or less than the first under-voltage threshold;

wherein, in response to a margining event changing the output voltage of the power supply, the fault detection mechanism is further configured to monitor the output voltage of the power supply to determine whether the output voltage is greater than a second over-voltage threshold, and monitor the output voltage of the power supply to determine whether the output voltage is less than a second under-voltage threshold.

* * * * *